Aug. 8, 1961  H. A. VON HORTENAU  2,995,070
COMBINATION EXPOSURE METER AND LENS
Filed Aug. 16, 1956  5 Sheets-Sheet 1

INVENTOR.
HANS A. VON HORTENAU
BY
ATTORNEY

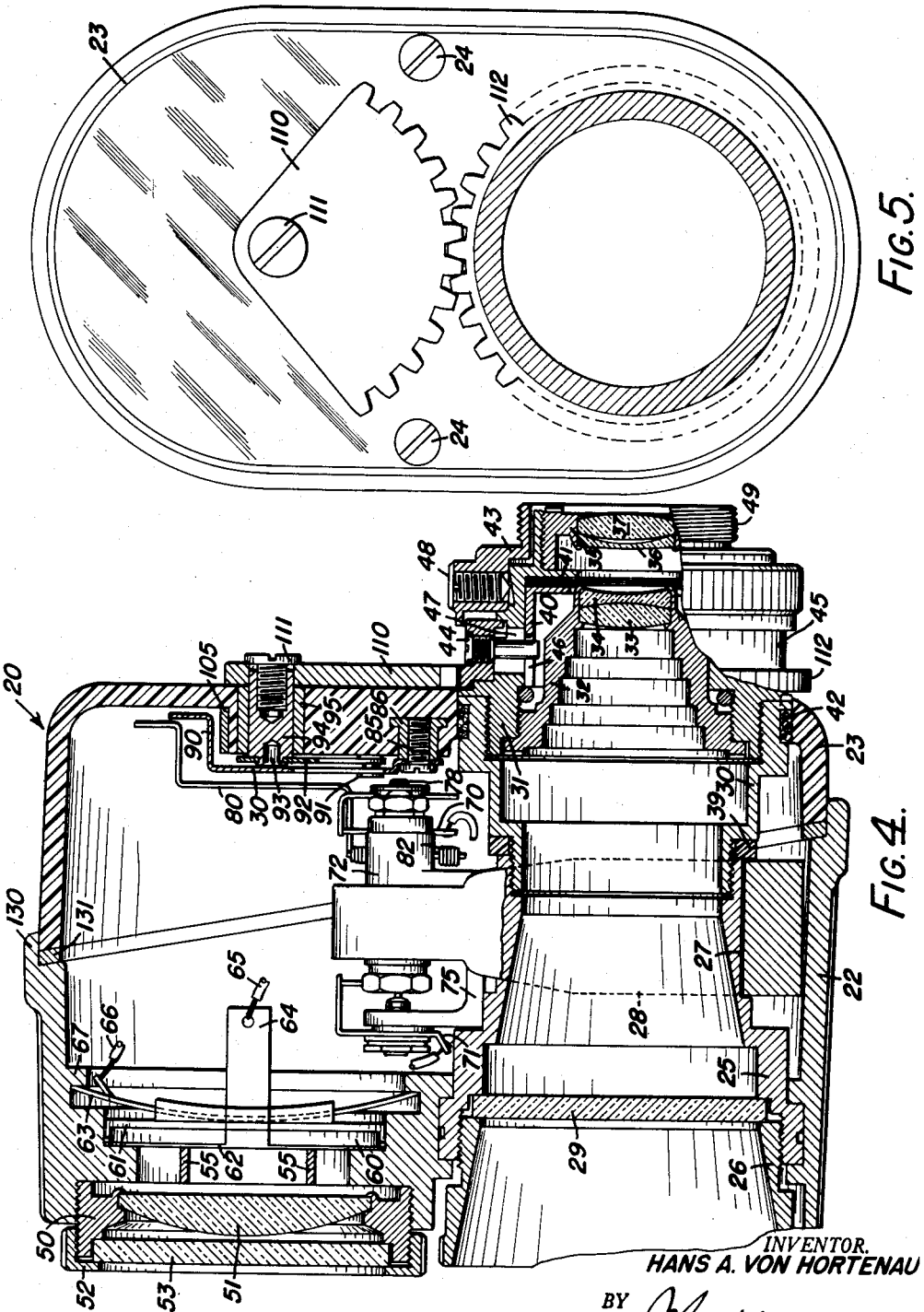

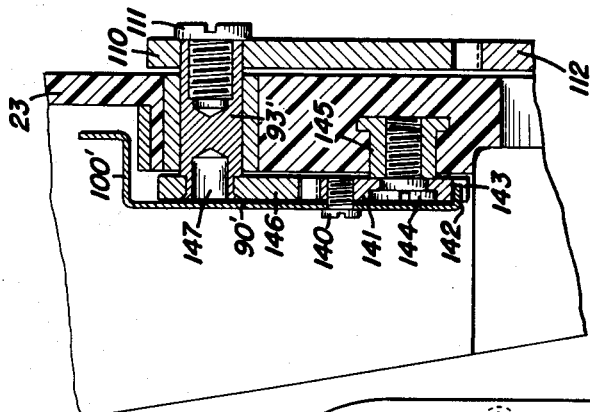
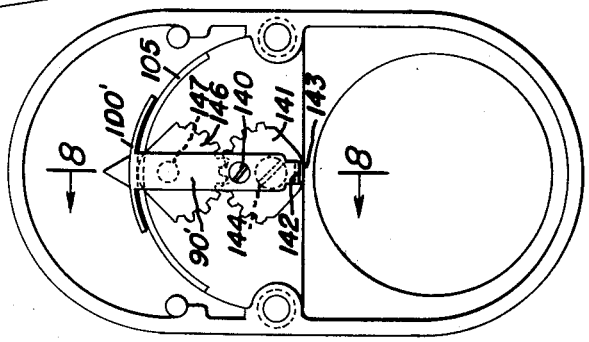
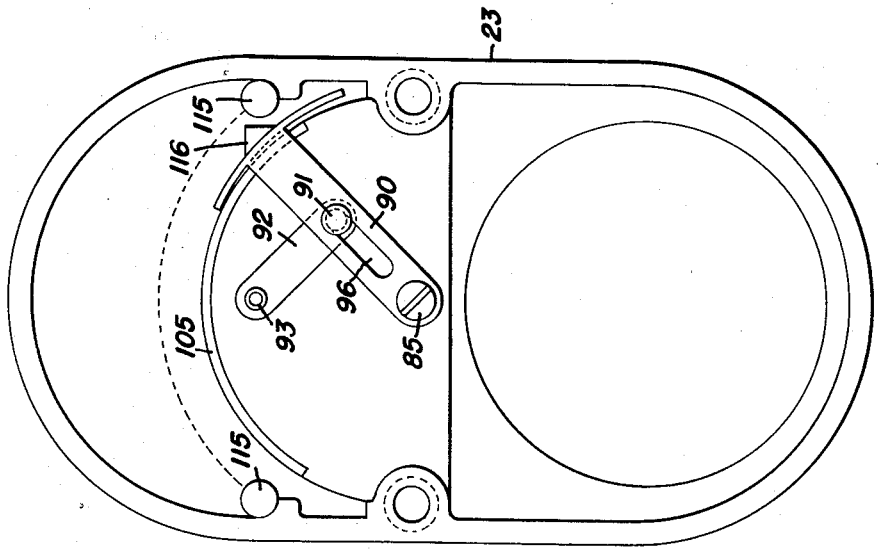
INVENTOR.
HANS A. VON HORTENAU
BY
ATTORNEY

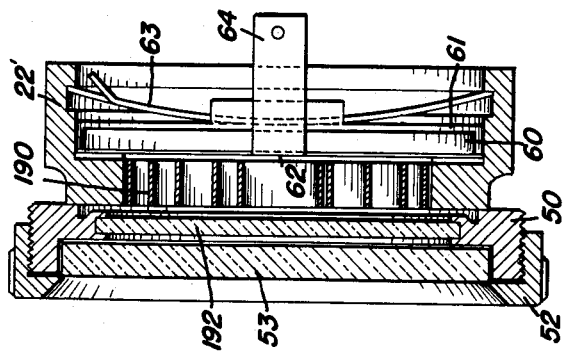
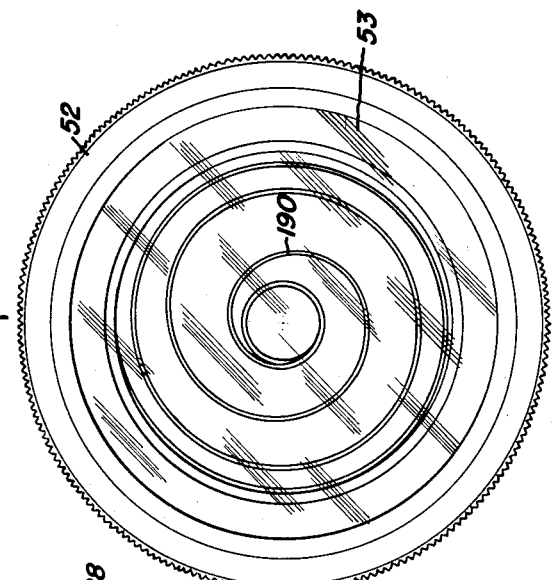
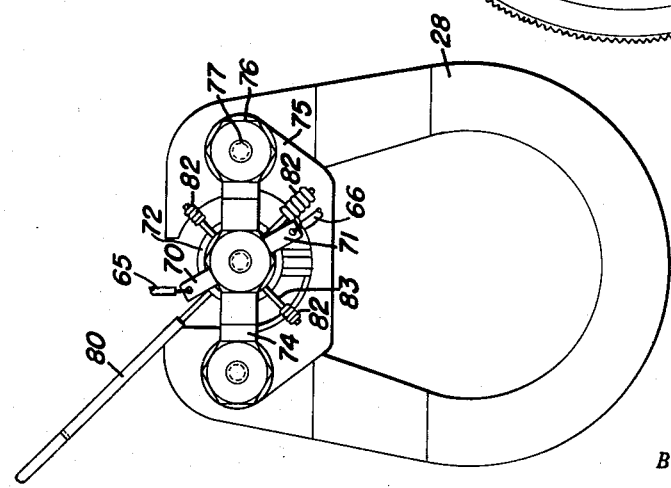

Aug. 8, 1961 H. A. VON HORTENAU 2,995,070
COMBINATION EXPOSURE METER AND LENS
Filed Aug. 16, 1956 5 Sheets—Sheet 5
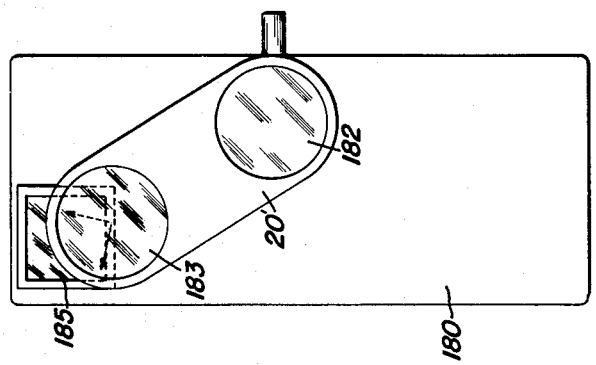
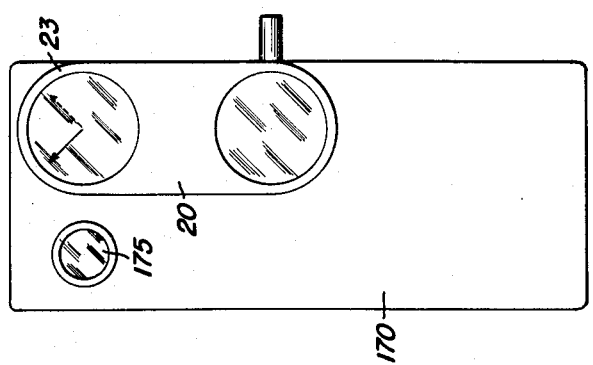
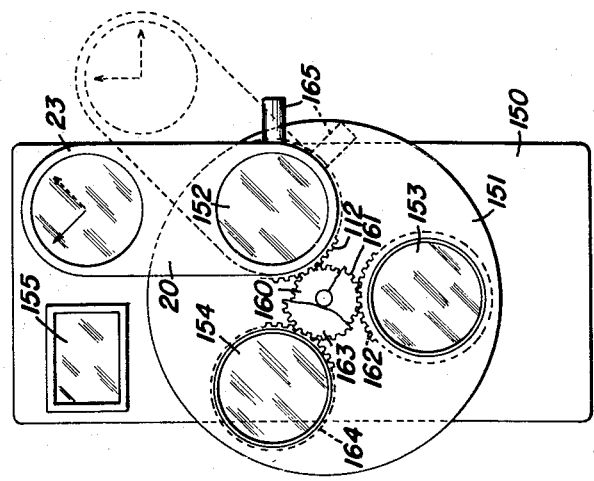
INVENTOR.
HANS A. VON HORTENAU
BY
ATTORNEY

United States Patent Office 2,995,070
Patented Aug. 8, 1961

2,995,070
COMBINATION EXPOSURE METER AND LENS
Hans A. von Hortenau, Rochester, N.Y., assignor to Elgeet Optical Company, Inc., Rochester, N.Y., a corporation of New York
Filed Aug. 16, 1956, Ser. No. 604,402
5 Claims. (Cl. 95—10)

The present invention relates to photographic cameras and more particularly to the lenses of photographic cameras and to means for accurately setting the diaphragm opening or lens aperture of a camera.

Experience demonstrates that incorrect exposure is the main cause of unsatisfactory pictures, especially color pictures. In fact, for color pictures the correct determination of the existing light conditions and the correct setting of the diaphragm opening to suit the existing light conditions are practical necessities. It is quite common, therefore, to employ light meters for determining the optimum amount of light which, when passed through the lens of a camera, will properly expose the photosensitive emulsion.

It has been found, however, that even using a good camera and a good exposure meter, the percentage of satisfactory color pictures is relatively low because of the difference between the acceptance angle of the camera and that of the hand-held exposure meter. Moreover, with the ordinary hand-carried exposure meter, the correct values on the oftentime rather complicated instrument must not only be first found and adjusted, but the results obtained must then be translated to the camera dials or other setting mechanism of the camera. This entails loss of time, especially in a case of snapshots of rapidly moving objects, so that often a particular, unique situation is lost before the picture of it can be taken. Another serious defect of the hand-carried exposure meter is that while its values are correct for an average camera construction, they differ from the values appropriate to a different type of camera, especially with respect to the reduction of light caused by the lens system and the acceptance angle which differ from camera to camera. This makes it necessary for the photographer to calibrate by careful cut and try method his exposure meter for his own camera.

Because of the disadvantages of the hand-carried exposure meter, in some instances exposure meters have been built into cameras. The disadvantages of these in-mounted meters are that they are space-consuming, especially in the limited space conditions of miniature cameras. Moreover, they require expensive, fine mechanical and electrical transmission and regulation of parts. If any trouble or damage occurs by reason of corrosion or wear, or from dropping the camera, the whole camera must be sent back to the manufacturer.

One object of the present invention is to provide an exposure meter construction, which is mountable on a camera, so that pictures can be taken quickly without the photographer having to first glance at a hand-carried exposure meter and then transfer his attention to the camera, but which is clear of the objections of previous camera-mounted meters.

Another object of the invention is to provide an exposure meter mounting which is detachable from the camera and which will permit the exposure meter to be repaired, if required, without requiring return of the whole camera to the factory.

Another object of the invention is to provide an exposure meter which is associated with the objective lens of a camera, so that the proper diaphragm opening can be determined and adjusted without the photographer having to glance first from one to the other, but simply by setting the diaphragm opening directly from the exposure meter reading.

Another object of the invention is to provide a unitary construction in which the objective lens, diaphragm, exposure meter, and setting element are combined in a single unit that is directly substitutable for a conventional objective.

Another object of the invention is to provide a unit of the character described which will be compact and highly accurate, and which is adaptable to most types of still and moving picture cameras.

Other objects of the invention are to provide a unit of the character described having simple and robust construction, properly sealed, protected from aging, corrosion, and abrasion of movable parts, composed of a few simple elements, making its assembly easy and relatively inexpensive, and which is easy to repair.

Still another object of the invention is to provide a unit of the character described which is mountable on the lens-carrying turret of a camera and through which by simple, mechanical, manually-adjustable means the diaphragm aperture of the wide angle, and telephoto lenses carried by the turret can be set when adjusting the lens aperture of the normal angle lens of the unit.

Other objects of the invention will be apparent hereinafter from the specification and from the recital of the appended claims.

In the drawings:

FIG. 4 is a longitudinal, or axial, section through the unit on an enlarged scale;

FIG. 5 is a transverse section through the mechanism showing details of the means for setting the diaphragm opening;

FIG. 6 is a transverse section on the scale of FIG. 5, showing one means for adjusting the pointer which indicates the diaphragm opening;

FIG. 7 is a view, similar to FIG. 6, but illustrating another means for adjusting the pointer which indicates the diaphragm opening;

FIG. 8 is a fragmentary axial section on an enlarged scale taken on the line 8—8 of FIG. 7 looking in the direction of the arrows;

FIG. 9 is a detail view showing the horseshoe magnet and its cooperating coil and the needle of the exposure meter which indicates the prevailing light condition;

FIG. 10 is a front elevation of a modified construction showing particularly a modified form of light-baffle for the exposure meter;

FIG. 11 is a section on the line 11—11 of FIG. 10 looking in the direction of the arrows;

FIG. 12 is a front view on a reduced scale showing how the unit of the present invention may be used on a moving picture camera equipped with a rotary lens turret;

FIG. 13 is a front elevation showing how the device of the present invention may be used on a single lens camera; and FIG. 14 is a view showing still another way in which the device may be used on a single lens camera.

Figure 1:
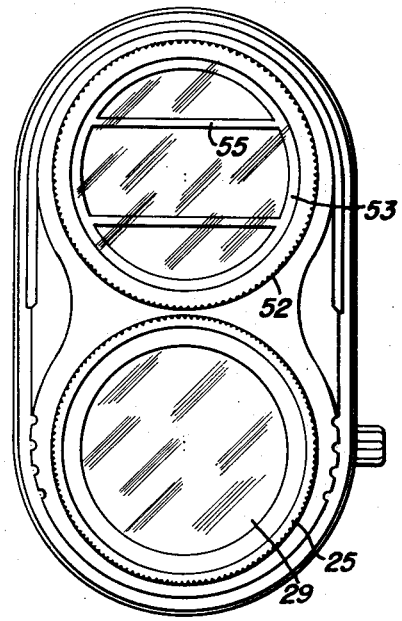
FIG. 1 is a front elevation of a combined exposure meter, lens, and diaphragm unit made according to one embodiment of this invention.

The device of the present invention constitutes a union between a photo-lens assembly equipped with a movable diaphragm of conventional type, a photoelectric cell of the barrier layer type, a micro-ammeter, and means connecting the micro-ammeter with the diaphragm setting mechanism. The light reflected from the subject travels to the exposure meter through a suitable adapter, whose purpose is to match the acceptance angle of the photoelectric cell with the acceptance angle of the photo lens without too great a loss of the "apparent brightness"; and this light falling on the photoelectric cell generates an electric current in proportion to the quantity of light. This current causes the pointer of the micro-ammeter, which is electrically connected to the photoelectric cell, to be deflected. The deflection of the pointer is observable by the photographer through a window in the protection hood, which is located around the device; and the photographer matches the pointer deflection with a lever which is fixed on the diaphragm setting ring. Thereby the diaphragm aperture is adjusted to the correct value in relation to the light conditions on the subject to be photographed. The pointer can have three separate small openings through which the correct light scale value can be observed for, respectively, black and white film, color film outdoors, and color film indoors, and can also be adjusted for any other film exposure index. The diaphragm setting can be checked on a scale calibrated in $f$ stop values. The whole unit is adapted to be mounted on the camera by screwing it into the conventional opening provided for the single lens of a single lens camera, or into one of the lens openings of a multiple lens turret of a still or moving picture camera. It is adapted to be tilted for use to a position in which its contour does not interfere with the viewfinder of the camera.

Referring now to the drawings by numerals of reference, 20 (FIGS. 2, 3 and 4) denotes the housing for the device. This housing comprises a forward section 22 which is opaque and a rear section 23, which is transparent. The two sections are connected together by screws 24 as shown in FIG. 5. The front section 22 of the housing overlaps the rear section 23; and it has an overlapping flange 130 (FIG. 4) which is arranged on the diagonal. Between the two sections there is a neoprene gasket 131.

Mounted in the lower part of the housing is a magnet supporting ring 25. Threaded in the front end of this ring is a bezel or ring 26 which serves to clamp a suitable filter 29 against a seat on ring 25.

Mounted on the peripheral surface 27 of the supporting ring 25 is a magnet 28 (FIGS. 4 and 9) which as illustrated is of the horseshoe type, but which may be of any other suitable type. Threaded in the rear end of the supporting ring 25 is the lens supporting ring 30. Threaded internally into the rear end of the lens supporting ring 30 is a lens barrel 31, into which there is threaded the front mount 32 of the objective. In the instance shown, the front lens mount 32 carries the couplet comprising the double convex lens 33 and the double concave lens 34. Threaded into the rear of the lens barrel 31, in the instance shown, is the back lens mount 35 which carries the couplet comprising the meniscus 36 and the double convex lens 37. A gasket 39 is interposed between the supporting ring 25 and the lens support ring 30 as a seal; and a gasket 42 is secured in a peripheral recess in the lens supporting ring 30 to support this ring from the rear section 23 of the housing. Obviously the invention is not restricted to the specific objective lens combination shown but may be used with any suitable objective.

Rotatably mounted in the lens barrel 31 is the iris or diaphragm cup 40 which carries the diaphragm leaves 41. These are mounted between opposing flanges of the cup 40 and of the barrel 31 so that rotation of the cup 40 will vary the diaphragm opening, depending upon the direction of rotation of the cup 40.

The cup 40 is adapted to be rotated by handle 165 (FIGS. 2 and 3) which is fixedly secured in a ring 45 that is rotatably mounted on the lens barrel 31. This ring 42 carries a pin 44 which passes through a slot 47 in the lens barrel 31 and which engages in a slot 46 in the diaphragm cup 40. The unit is adapted to be secured to a camera by threading the nose 49 of ring 43 into the conventional lens opening in the camera or in a turret attached to the camera. A set-screw 48, which threads into the ring 43, serves to secure the ring 43 against rotation relative to lens barrel 31.

The front portion 22 of the housing is shaped like a double loop or "8", the ring 25, and the parts associated therewith, being supported in the lower loop. Threaded into the upper loop portion is an adapter mount 50 which is adapted to hold a single lens 51. Secured in the adapter mount in front of the single lens 51 by means of a bezel or ring 52 is a suitable filter 53.

The upper loop portion of the housing section 22 supports also the acceptance angle baffles which are selected so that the acceptance angle of the photo cell will match the acceptance angle of the lens without too great a loss of brightness. These baffles may comprise two parallel bars 55 mounted chordially in a circular opening in the front section 22 of the housing.

Mounted behind the baffles is the photo cell which comprises the bar cell 60, the insulating cup 61, the front contact ring 62, and the back contact spring plate 63. The spring plate 63 holds the bar cell 60, which is contained within the cup 61, against the front contact ring 62. This ring has a rearwardly extending portion 64 projecting from it to which a wire, or other electric conductor, 65 is connected. The back contact spring plate 63 seats against the annular flange 67 provided in the front housing section 22 and has a wire, or other electric conductor, 66 connected to it. The contact 63 is positive and the contact 64 is negative.

The wires 65 and 66 are connected to the terminals 70 and 71 (FIG. 9), respectively, of the coil 72 which rotates between the poles of the magnet 28. The coil 72 is supported from the magnet at front and rear by straps 74 which are mounted upon a bracket 75 (FIGS. 4 and 9) by means of insulating bushings 76 (FIG. 9) and screws 77. The coil itself is secured on bearing studs 78 that thread into the straps 74.

Secured to the coil to rotate therewith is a pointer 80 which is bent rearwardly and then upwardly and then rearwardly again as shown in FIG. 4. Balance weights 82 (FIG. 9) are mounted on pins 83 that are secured in the coil so as to balance the movement of the needle 80 and secure uniformity of its movement.

Journaled on the stud 85 (FIG. 4) which is mounted in the bearing member or bushing 86 in the rear section of the housing 23 is a pointer or lever 90 which is bent rearwardly as shown in FIG. 4. This lever is connected by means of a pin 91 (FIG. 6) with a link 92 which is journaled on a stud 93 that is fastened to a shaft 94 which is journaled by means of the bushing 95 in the rear housing section 23. Pin 91 slides in the slot 96 in the pointer 90.

The pointer has an indicator frame 100 (FIG. 3) at its free end which is formed with four parallel prongs 101 that divide the frame into three windows 102, 103 and 104, respectively. These provide readings for black and white film, for color film outdoors, and for color film indoors, respecitvely. These windows read against an $f$ stop scale 105 (FIGS. 2, 3 and 4) which is secured to rear housing section 23.

Movement of the indicator 90 is effected through link 92 upon rotation of the shaft 94. To this shaft there is secured by means of a screw 111 a gear segment 110 (FIGS. 4 and 5). The gear segment 110 meshes with a gear 112 which is integral with the ring 45 so that it operates the diaphragm 41 through pin 44.

Stops 115 (FIG. 6) are provided at opposite sides of the pointer to engage the upwardly projecting portion 116 thereof to limit the movement of the pointer.

In operation, the light passes through the filter 53 (FIG. 4), the lens 51, and the acceptance baffles 55, to the sensitive bar cell 60, generating a small electromotive force which is conducted by wire 65 to the armature or coil 72 (FIG. 9) of the magnet 28, rotating that coil, to cause rotation of the pointer 80. The electrical circuit to the coil is completed through wire 66 (FIG. 4) and spring plate 63.

Figure 2:
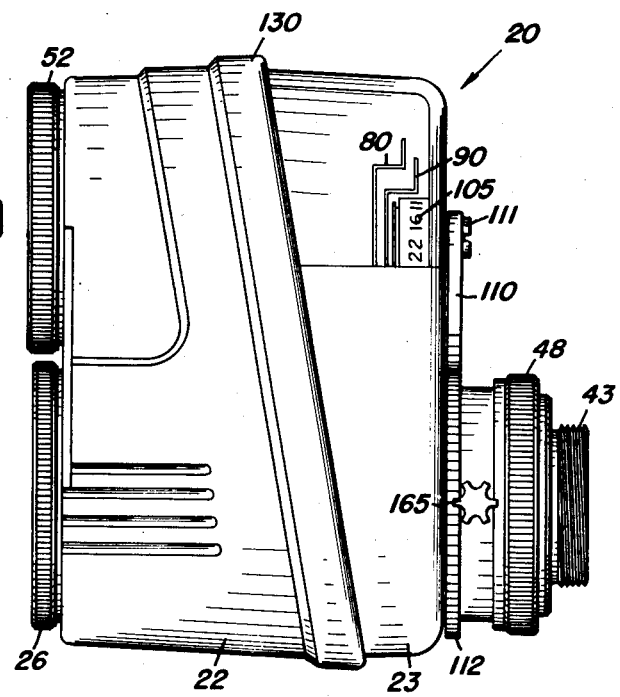
FIG. 2 is a side elevation of this unit.
Figure 3:
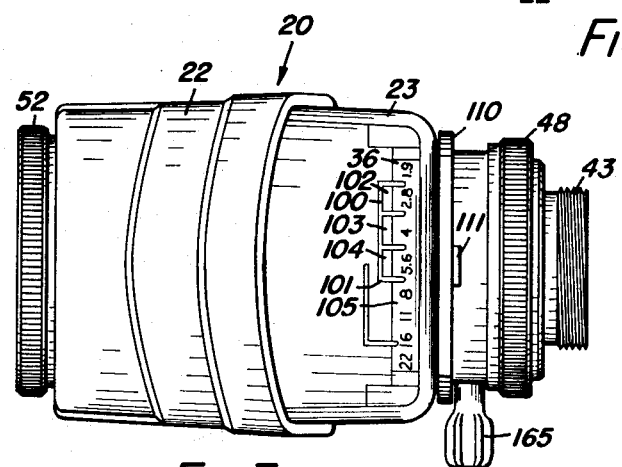
FIG. 3 is a plan view thereof.

The photographer observes the position of the pointer 80 and sets the pointer 90 to the corresponding position. This he does by rotating ring 45 by handle 165 (FIGS. 2 and 3). Rotation of ring 45 causes pin 44 (FIG. 4) to rotate diaphragm cup 40 and thereby causes rotation of the diaphragm leaves 41. It also causes the gearing 112, 110, to rotate the shaft 94 and needle 90. When needle 90 registers with pointer 80, then, the photographer knows that the diaphragm aperture has been correctly set for existing light conditions.

An alternate method of connecting the pointer 100 to the gear 110 is illustrated in FIGS. 7 and 8. Here the pointer 90' is secured by a screw 140 to a gear segment 141; and it has an inturned lower end 142 that engages in a notch 143 in this gear segment 141. The segment 141 is rotatably mounted in the rear housing section 23 by means of a stud 44 which threads into a nipple 145 that is mounted in housing section 23. The segment 141 meshes with a segment 146 which is riveted by means of the rivet 147 to the shaft 93 on which the segment 110 is mounted. The segment 110 meshes, as before, with a gear 112 that is integral with the diaphragm setting ring 45.

Adjustment for the film exposure index can be made mechanically by changing the position of the teeth of the gears 141, 146, or 112, 110, to one another, or optically, by using an iris adapter mounted in front of the photocell, or electrically, by means of a switch and resistors mounted either in series or in parallel in the photocell circuit.

The device of the present invention may be used on any conventional type of camera.

FIG. 12 shows how the device would be used with a camera, such as a moving picture camera, equipped with a turret 151 on which are mounted a wide angle lens 153, and a telephoto lens 154. The device 20 of the present invention itself is mounted on the barrel of the normal angle lens 152 in the manner previously described. 155 is the viewfinder window of the camera. The photographer sights through the transparent portion 23 of the housing and sets the pointer 90 as previously described. In setting the pointer 90, the gear 112 is rotated as previously described. This gear meshes with a gear 160 journaled coaxial with the turret 151. The gear 160 is keyed to rotate with coaxial gears 161 and 163 shown only fragmentarily. Gear 161 meshes with a gear 162 on the diaphragm setting ring of the wide angle lens 153 and gear 163 meshes with a gear 164 on the diaphragm setting ring of the telephoto lens 154. The ratios of gear pairs 161—162 and 163—164 are slightly different from one another and from gear pair 112—160. Thus, when the aperture of the normal angle lens 152 is adjusted in accordance with the position of the pointer 80 the gears 160, 161 and 163 are rotated thereby to adjust the correct lens aperture in the two other lenses 153 and 154 making these two lenses also ready instantly for an immediate wide angle or telephoto shot.

Of course, for wide angle or telephoto shots, the turret 151 must be rotated to bring the lens 153 or the lens 154 into the position occupied by the lens 152 in the drawing. This, of course, moves the exposure device, but it can be adjusted by movement of the handle 165 to any required for observation, and which will not interfere with the viewfinder 155. Because the rear section 23 of the housing is transparent the unit 20 can always be adjusted to a position where the pointer 90 can be observed horizontally by looking down from the top, without moving the camera out of its original picture-taking position.

On a single lens camera, such as denoted at 170 in FIG. 13, the device of the present invention may be mounted vertically as shown, and may be observed from the top. The camera 170 is here equipped with a tubular viewfinder 175. The camera must be lowered, however, to look at the exposure meter.

By modifying the construction somewhat so as to place the pointer housing above the photo cell, the pointer position can be observed either at the side or above the camera without moving the camera.

It is also possible to mount the photo cell between the lens and the front end of the viewfinder so as to locate the pointer in registry with the viewfinder of the camera. Thereby the pointer deflection can be observed through the viewfinder. Such construction is illustrated diagrammatically in FIG. 13. Here the camera is denoted at 180; and 182 is the standard lens of the camera. Here the pointers 80 and 90 (FIG. 4) are not located in line with, but are located slightly above the photocell 60 so that they register with one corner of the viewfinder window 185 so that the photographer while looking through the viewfinder window 185 can also see the indicators 80 and 90 in the transparent portion 183 of the housing 20.

The unit might also be constructed so that the photocell chamber is above the viewfinder and above the pointers, and so that the transparent part of the housing, which contains the pointers, extends from one end of the housing to the other and registers with the corner of the housing diagonally opposite that shown in FIG. 14.

Other modifications will be obvious to those skilled in the art.

In front of the photocell there may be mounted a tubular hood. The influence of the sky light being generally stronger than the light reflected from the ground, the front of this tubular hood can be cut obliquely so that the upper part of the hood is longer than the lower part, thereby cutting down more of the light coming from above than from below.

With the device of the present invention the graduations used for setting the diaphragm are far enough apart to permit easy proper setting of the diaphragm. In this device, moreover, the magnet surrounds the lens thereby making the device compact. With this device it is possible to employ a single round photocell, further lending to compactness. The device will not obscure the viewfinder built into the camera. The several gaskets or sealing rings prevent penetration of humidity into the housing which would destroy the accuracy of the galvanometer and of the photocell.

With the device of the present invention, measurements can be accurately made on the picture field because the exposure meter is adjacent the lens. Hence, a red filter can be put on the exposure meter; and then a blue filter, and by dividing one reading by the other and multiplying by the coefficient a determination can be made which filter should be used. This is precise color photography.

In order to get the correct geometric-photometric conditions for the photo-cell it is of importance to restrict the angle of acceptance of the photo-cell, and to match that angle as close as possible to the angle of view of the lens, without cutting down too much the amount of light reflected from the subject to be photographed. Different means have been proposed for this purpose such as deep recesses, baffles both horizontally and vertically located, masking grids and multi-cellular lenses. Most of these means cut down the light too much; and some of them, especially the multi-cellular lenses are expensive.

In FIGS. 10 and 11, I have shown an improved adapter which is in the form of a spiral of thin plastic, metal or other suitable material.

The general construction is the same as shown in FIG. 4. There is a filter 53 secured in the adapter mount 50 by a ring or bezel 52 and the adapter mount threads into the front portion 22' of the housing. The bar cell 60, the insulation cup 61, the front contact ring 62, and the back contact spring plate 63 are mounted as described with reference to FIG. 4. However, instead of the baffles 55 of FIG. 4 there is mounted, in front of the cell 60 and the front contact ring 62, a spiral 190 of thin plastic, metal, or other suitable material. This spiral, which is located in front of the surface of the photo cell, cuts down the angle of acceptance to a correct value so that practically all points on the surface of the photo-cell have a constant light acceptance determined by the portions of two adjacent, almost circular, almost parallel, spiral walls of the spiral 190, which have practically a constant distance from one another. A plate of transparent plane glass 192 is located in the adapter ring in front of the spiral 190 for sealing purposes.

Obviously other types of baffles such as a multi-cellular lens and a honeycomb mask may be used in the device of the present invention.

While the invention has been described in connection with several different embodiments thereof, it will be understood that it is capable of further modification; and this application is intended to cover any variations, uses or adaptations of the invention, following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A removable unit for attachment to a photographic camera which has a lens opening in its front, said unit comprising a housing, a generally tubular member mounted in said housing at one side of said housing and constituting an objective lens mount and having a compound lens system mounted therein, a multi-leaved diaphragm positioned in said tubular member between lenses of said system, a light-sensitive cell mounted in the front part of said housing outside said tubular member, a light-meter including a single horseshoe magnet, a single rotatable coil, and a first pointer mounted in said housing outside said tubular member said first pointer being movably mounted adjacent the rear of said housing and being secured to said coil to be moved thereby upon rotation of said coil, said magnet being mounted in said housing to have its bight portion surrounding said tubular member, said coil being rotatably mounted between the poles of said magnet and being electrically connected to said cell to be moved thereby, said housing having two openings therein at its front registering with said tubular member and with said cell, respectively, for admitting light to said tubular member and to said cell, respectively, manually-adjustable means connected to said diaphragm for adjusting the diaphragm leaves to control the diaphragm aperture, and a second, movable pointer connected to the last-named means and disposed adjacent the rear of said housing to be brought into registry with the first-named pointer by manual adjustment of the diaphragm thereby to produce the diaphragm aperture required for the prevailing light conditions as indicated by said first pointer, the front part of said housing being opaque except for the openings in the housing and the rear part of said housing being transparent for easy reading of said pointers, and means at the rear of said unit for removably securing said unit to said camera with said lens system in optical alignment with the lens opening in the front of said camera and in place of a conventional objective lens mount.

2. A removable unit as claimed in claim 1, wherein said second pointer has a plurality of indicating portions thereon which are used, respectively, for black and white film, for color film outdoors, and for color film indoors, and in which there is a graduated $f$ stop scale provided on said housing against which said indicating portions read.

3. A removable unit as claimed in claim 1 wherein an adapter is mounted in said housing between said cell and the opening in said housing which admits light to said cell, said adapter serving to cause the light-acceptance angle of said cell to match approximately the light-acceptance angle of said lens system.

4. A removable unit as claimed in claim 3 wherein a filter is removably mounted in said housing between said adapter and the opening which admits light to said cell to control the quality of the light admitted to said cell, and a like filter is removably secured in said tubular member in front of said lens system and between said lens system and the opening in said housing which admits light to said lens system.

5. A removable unit as claimed in claim 3 in which said adapter is in the form of a spiral baffle mounted in front of said cell and between said cell and the opening in said unit which registers with said cell.

References Cited in the file of this patent

UNITED STATES PATENTS

| | | |
|---|---|---|
| 2,051,061 | Tonnies | Aug. 18, 1936 |
| 2,229,289 | Goldhammer | Jan. 21, 1941 |
| 2,268,105 | Bing | Dec. 30, 1941 |
| 2,302,597 | Bing | Nov. 17, 1942 |
| 2,358,083 | Mihalyi | Sept. 12, 1944 |
| 2,387,466 | Rath | Oct. 23, 1945 |
| 2,444,674 | Rath | July 6, 1948 |
| 2,553,656 | Kirby | May 22, 1951 |
| 2,885,937 | Donnay | May 12, 1959 |

FOREIGN PATENTS

| | | |
|---|---|---|
| 875,400 | France | June 22, 1942 |
| 849,953 | Germany | Sept. 18, 1952 |
| 852,653 | Germany | Oct. 16, 1952 |
| 698,573 | Great Britain | Oct. 21, 1953 |